March 17, 1925.

W. J. DE BAS 1,530,308

MOLD

Filed March 1, 1922   2 Sheets-Sheet 1

Inventor
Willem J. DeBas
By Norman T. Whitaker
his Attorney

March 17, 1925.  W. J. DE BAS  1,530,308
MOLD
Filed March 1, 1922   2 Sheets-Sheet 2

Inventor
Willem J. DeBas
By Norman T. Whitaker
his Attorney

Patented Mar. 17, 1925.

1,530,308

UNITED STATES PATENT OFFICE.

WILLEM JACOBUS DE BAS, OF THE HAGUE, NETHERLANDS.

MOLD.

Application filed March 1, 1922. Serial No. 540,221.

*To all whom it may concern:*

Be it known that I, WILLEM JACOBUS DE BAS, manufacturer, residing at The Hague, Kingdom of the Netherlands, have invented certain new and useful Improvements in Molds, of which the following is a specification.

In my original Patent, #1,390,244, for process of producing artificial stone, an improved mold for carrying out such process is set forth. The present application is intended to set forth and claim the mold structure.

Below two modifications of the improved mold are referred to, either of which may be employed to carry out the process claimed in the above mentioned patent.

Figure 1:
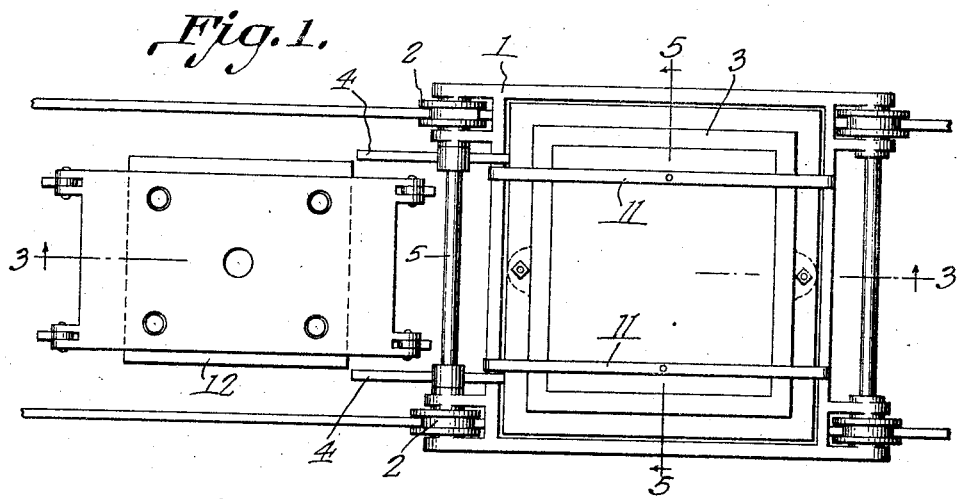
Figure 2:
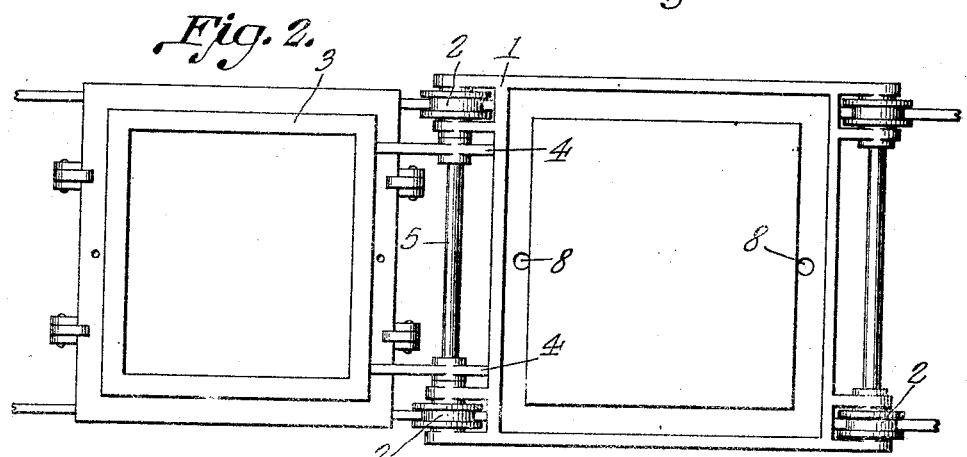
Figure 3:
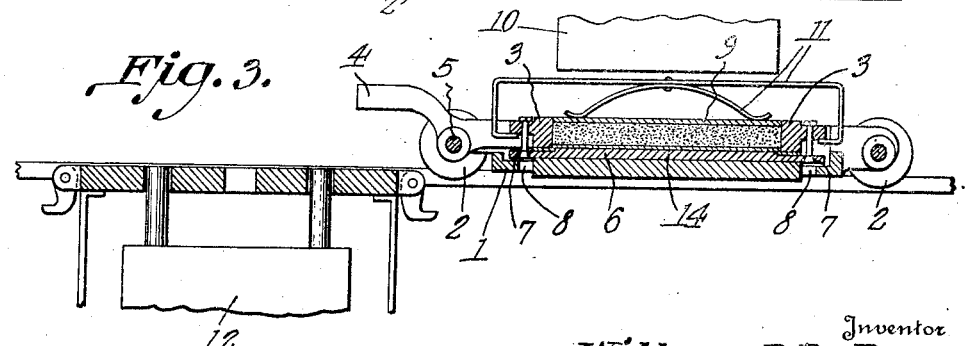
Figure 4:
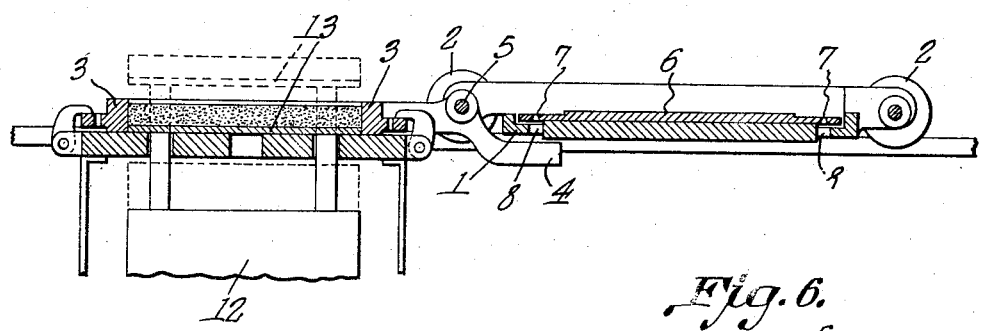
Figure 5:
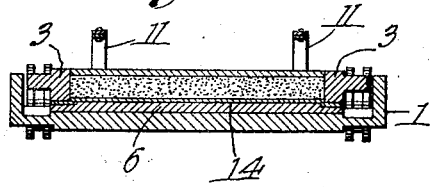
Figure 6:
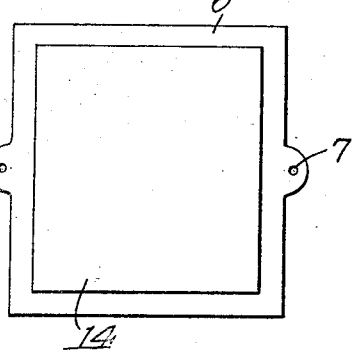
Figure 7:
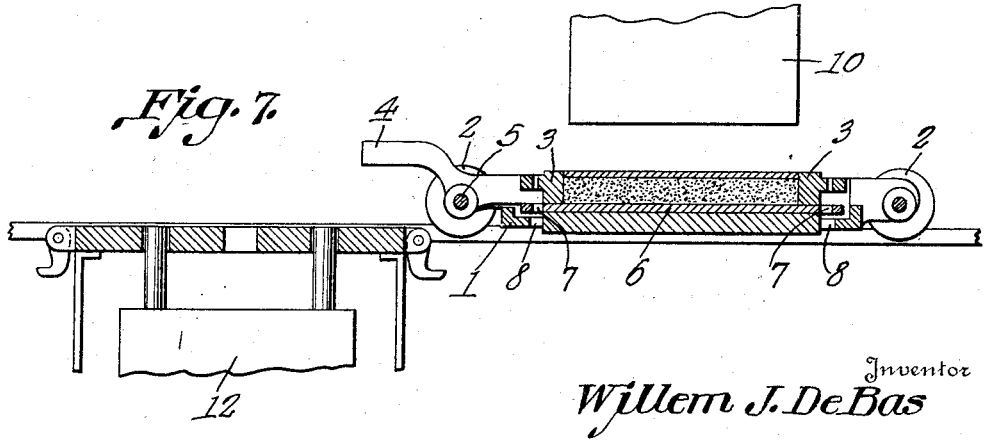

On the drawings:

Figure 1 is a top plan view showing the mold in closed or press engaging position, Fig. 2 is a top plan view showing the mold in open position, Fig. 3 is a longitudinal section on line 3—3 of Fig. 1, Fig. 4 is a similar view showing the mold in open position, Fig. 5 is a section on line 5—5 of Fig. 1, Fig. 6 is a detail of the bottom plate, and Fig. 7 is a longitudinal section showing a slightly modified form of the invention.

1 represents the cradle on which rests the mechanical compression mold and which can be moved into the press by means of rollers 2.
3 represents the side walls of the mold forming a frame. This frame can be turned about the shaft 5 by means of the stirrup or lever 4. 6 indicates the bottom plate of the compression mold which has holes 7 that lie opposite to the openings 8 arranged in the bottom of the cradle 1.

Numeral 9 is a covering plate covering the wall in the mold, while 10 is a press. Numeral 11 indicates springs suitably tensioned for the purpose of holding the plate 9 in place. A press plunger 12 is suitably positioned and a glass plate 13 is placed, as clearly shown in Fig. 4. Covering the bottom plate 6 is a yielding auxiliary surface 14 which is impervious to air.

The operation of the device is as follows:

A yielding surface plate 14 is placed over the bottom plate 6 and is clamped down by the frame 3. Mortar or cement which is used to form artificial stone is placed in mold formed by the frame 3 and the yielding surface 14. This mold is then run on track ways and into a press 10 and during this process coloring matter is added to form veins. After the material has gone through this process lever 4 is actuated and material may be put through other processes, such as grinding, polishing, etc.

It must be understood that only a preferred embodiment of my invention is herein shown and described and that any departure from the same, such as in shape, size or arrangement of parts may be resorted to without departing from the spirit of the invention or from the spirit or scope of the subjoined claims.

Having thus described my invention, what I claim is:

A mold comprising side walls forming a frame; a shaft at each end of the said frame, sets of flanged wheels journalled on said shaft, a longitudinal extension from said frame, said extension being adapted to throw said frame to an inverted position using one set of flanged wheels as a pivot.

WILLEM JACOBUS DE BAS.